US008301910B2

(12) United States Patent
Perepa et al.

(10) Patent No.: US 8,301,910 B2
(45) Date of Patent: Oct. 30, 2012

(54) INTELLIGENT, EXPORT/IMPORT RESTRICTION-COMPLIANT PORTABLE COMPUTER DEVICE

(75) Inventors: Bhargav V. Perepa, Austin, TX (US); Sujatha Perepa, Austin, TX (US); Vishwanath Venkataramappa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2015 days.

(21) Appl. No.: 10/755,829

(22) Filed: Jan. 12, 2004

(65) Prior Publication Data

US 2005/0154904 A1 Jul. 14, 2005

(51) Int. Cl.
*G06F 21/00* (2006.01)
*G06F 11/30* (2006.01)
*G06F 12/14* (2006.01)

(52) U.S. Cl. .......... 713/193; 713/182; 713/194; 726/27; 726/29; 726/30; 380/30; 705/51; 705/52; 705/56; 705/59; 709/228; 455/456.1

(58) Field of Classification Search .................. 713/182, 713/193, 194; 709/228; 726/27, 29, 30; 380/21, 30; 705/51–52, 56, 59
See application file for complete search history.

(56) References Cited

U.S. PATENT DOCUMENTS

| 7,178,034 B2* | 2/2007 | Cihula et al. | 713/186 |
|---|---|---|---|
| 7,185,360 B1* | 2/2007 | Anton et al. | 726/3 |
| 7,188,251 B1* | 3/2007 | Slaughter et al. | 713/182 |
| 2002/0138452 A1* | 9/2002 | Cox | 705/401 |
| 2002/0147912 A1* | 10/2002 | Shmueli et al. | 713/182 |
| 2003/0188199 A1* | 10/2003 | Tadano et al. | 713/201 |
| 2004/0205194 A1* | 10/2004 | Sahai | 709/228 |
| 2004/0236952 A1* | 11/2004 | Girouard et al. | 713/182 |
| 2005/0125673 A1* | 6/2005 | Cheng et al. | 713/182 |
| 2005/0137904 A1* | 6/2005 | Lane et al. | 705/1 |

FOREIGN PATENT DOCUMENTS

| EP | 0 769 751 A1 | 4/1997 |
|---|---|---|
| EP | 0 997 808 A2 | 5/2000 |
| WO | WO 03/034192 A1 | 4/2003 |

* cited by examiner

*Primary Examiner* — Edan Orgad
*Assistant Examiner* — Kari Schmidt
(74) *Attorney, Agent, or Firm* — Yudell Isidore Ng Russell PLLC

(57) ABSTRACT

A method and system that enables cross-border compliance with export restrictions of particular computer technology, including software loaded on a computing device. The computing device is loaded with software, and has a country location device, such as a low-end GPS device. The country location device (country locator) stores the present geographic location of the device in a location register. When the computing device is turned on or the software is activated for operation on the computing device, a security utility of the software compares the value in the register against a list of pre-established locations that are export-restricted. When the value matches (or falls within a range) of one of pre-established locations, the features of the software that are export restricted are automatically disabled.

29 Claims, 5 Drawing Sheets

INTELLIGENT, EXPORT/IMPORT RESTRICTION-COMPLIANT PORTABLE COMPUTER DEVICE

BACKGROUND OF THE INVENTION

1. Technical Field

The present invention relates generally to computer software and specifically to export-restricted computer software loaded onto computing devices. Still more particularly, the present invention relates to a method and system for dynamically maintaining compliance with export or geographic-based restrictions of computer software when the computing device is transported to other geographic locations.

2. Description of the Related Art

Governmental entities, such as the United States Commerce Department, often place export restrictions on computer technology, both hardware and software. These restrictions are based on some determination that the particular technology is vital to national advancement in certain technological areas (such as military applications), maintaining national security, and/or beneficial to advancement of U.S. economy. Tied to these factors is a concern that certain technologies, if expected, may fall into the wrong hands and be utilized in undesirable ways that may negatively impact the economy, security, or prestige of the country.

High strength encryption technology, for example, is export restricted to certain countries. With the continuing advancement of current publicly available software that includes high strength encryption and the ease with which software can be loaded onto a portable device and transported/exported to another country, government control over the export of these technologies is becoming more difficult. For example, current versions of Netscapeg® and Internet Explorer® (IE) feature high strength encryption products, which are export restricted, in addition to their low strength encryption versions that are export compliant. These very popular browser applications are loaded on a large number of desktop and portable computers.

Desktops and portable computing devices that are specifically made for export are loaded with export compliant versions of software by the manufacturer. However, a large number of systems made for local (internal) use are shipped by individuals (or retailers) to other countries. Also, many individuals carry their laptops and other portable computing devices out of the country when they travel. These computing devices, made for utilization within the United States, typically have the export restricted product (e.g., high strength encryption software) loaded on the system. Additionally, with the increased globalization of the workforce, many portable computer devices such as laptops and tablet PCs often get carried across country boundaries by business professionals.

There is currently no way to stop this inadvertent (or sometimes deliberate) export of export-restricted products. The government is unable to check the software loaded on every computing device leaving the country and furthermore, most of these devices (perhaps with the exception of laptops that are screened when carried through airport terminals) are carried out without the government authorities being aware. The present invention recognizes that it would be beneficial to provide a built-in mechanism for ensuring compliance with export restrictions on computer technology.

SUMMARY OF THE INVENTION

Disclosed is a method and system that enables cross-border compliance with export restrictions of particular computer technology, including software loaded on a computing device. The computing device is loaded with software, which identifies itself to the OS as export-restricted or is identified as such by the installer of the software. The computing device is provided with a country location device, such as a low-end GPS device, linked to the BIOS and the OS of the computing device. The country location device (country locator) stores the present geographic location of the computing device in a location register.

When the computing device is turned on or the software is activated for operation on the computing device, a security utility of the software reads the value within the location register and compares the value against a table/list of pre-established locations that are export-restricted. When the value matches (or falls within a range of) one of the pre-established locations, the feature(s) of the software that are export restricted are automatically disabled. In one embodiment, only the particular restricted features are disabled and the remaining functions of the software are allowed to execute. Additionally, for software having both a restricted version and a similar unrestricted version (dual-purpose software), the unrestricted version is enabled by default, and access to the restricted version requires a verification that the present location is not on the list of export-restricted countries. When access to the software is limited to specific unrestricted features, the user of the computing device may receive a notification that export restrictions prevent activation of the remaining restricted features. In another embodiment, the entire software is disabled and a message sent to the user that the requested use is unauthorized in that country or violates an export restriction of the software.

Various methods are provided for updating or downloading the list of export restricted countries. In one implementation, an RFID receiver is placed within the computing device. Also, each port (sea, land, air) is equipped with an export compliance mechanism having a digitized list of export restricted countries and an RFID transmitter that broadcasts the list of export restricted countries. This list is received via the RFID receiver (within range of the transmitter) and stored in the memory (e.g., EEPROM) of the computing device.

Export compliance functionality may be provided as a utility within the software itself or as a separate software that completes the monitoring and blocking (access) features. Computing devices that are already loaded with export-restricted software can be updated with the compliance software via Internet download or user installation.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention provides a method and system that enables dynamic cross-border compliance with export restrictions of particular computer technology, including software loaded on a computing device. The invention is described with specific reference and description of a generic computing device, which is a device capable of executing software that may be subject to export restrictions. Thus, computing device may be a laptop computer, desktop computer, handheld computer, or even a cellular phone, etc.

Figure 1:
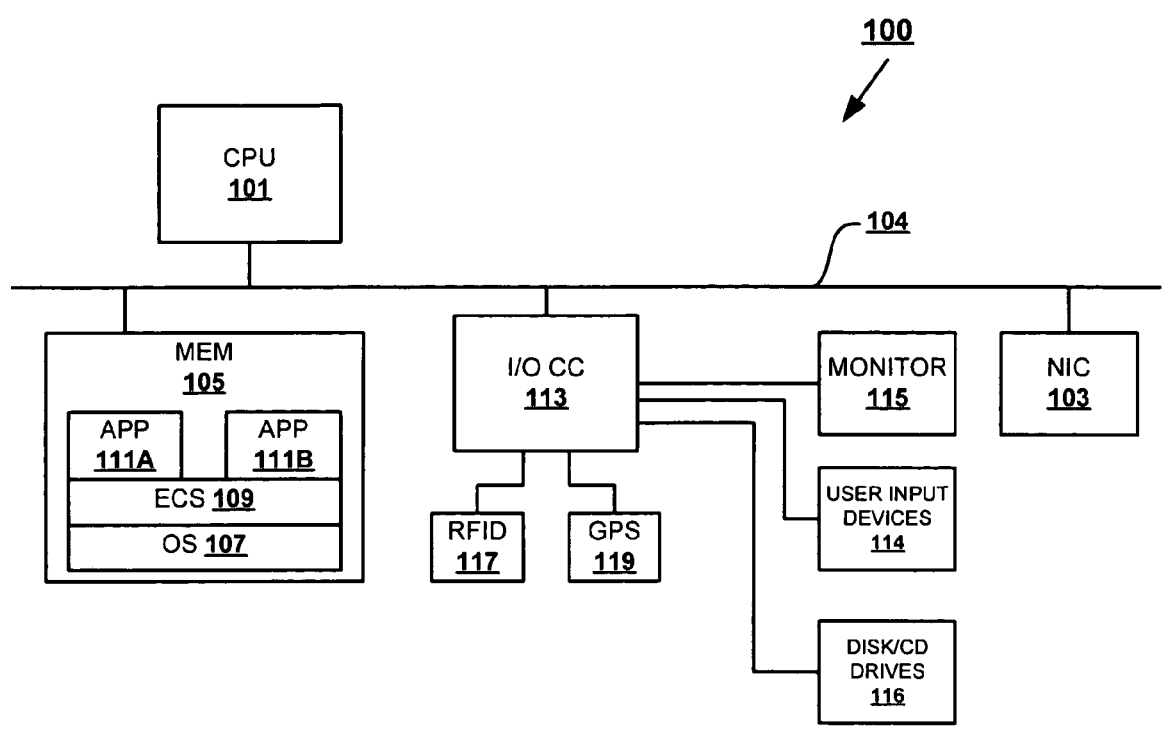
FIG. 1 is a block diagram of a laptop, representing a portable computer device, within which the features of the present invention may advantageously be implemented.

With reference now to the Figures and in particular to FIG. 1, there are illustrated hardware (and software) components of an exemplary computing device. Computing device 100, comprises a processor (CPU) 101, which is coupled via a system bus 104 to a memory 105, input/output controller (I/OCC) 113, and network interface controller (NIC) 103. NIC 103 is utilized to connect computing device 100 to external networks, such as the Internet. Coupled to I/OCC 113 are monitor 115, user input devices (mouse, keyboard, etc.) 114, input drives (disk and/or CD drives, etc.) 116. Also coupled to I/OCC 113 are two wireless sensors, an RFID sensor (or receiver) 117 and a GPS sensor (or country locator device) 119. RFID sensor 117 and GPS sensor 119 are respectively utilized to complete export restricted country list updates and country location, both of which are described in greater details below.

Figure 2:
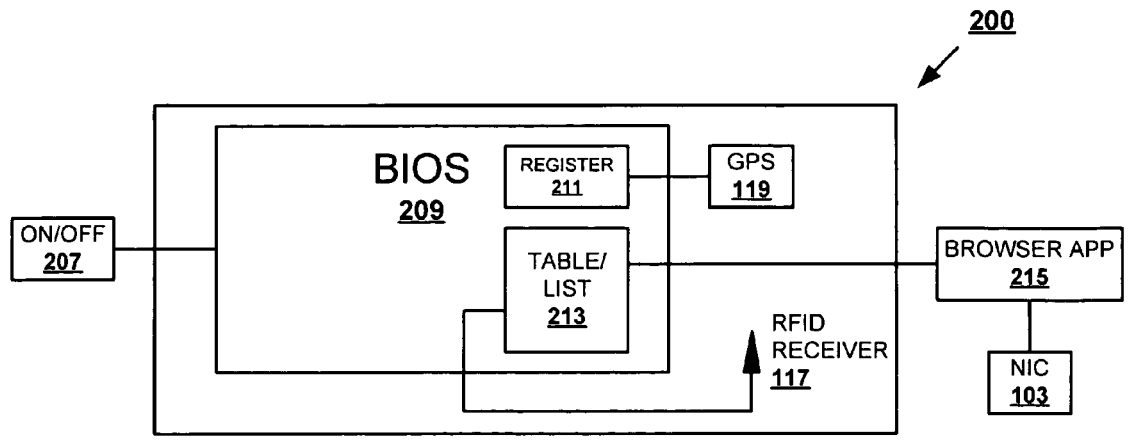
FIG. 2 is a block diagram of an exemplary country locator subsystem of the computer device of FIG. 1, according to one embodiment of the invention.

FIG. 2 illustrates an exemplary country locator subsystem of the computing device of FIG. 1. Country locator subsystem 200 comprises several components of computing device 100, specific to the functional operation of the invention. As illustrated, country locator subsystem (CLS) 200 comprises a power on/off button 207, utilized to power the computing device on and off. CLS 200 also comprises a basic input output system (BIOS) 209, which performs a power on self test (POST) operation when computing device 100 is first turned on.

Figure 3A:
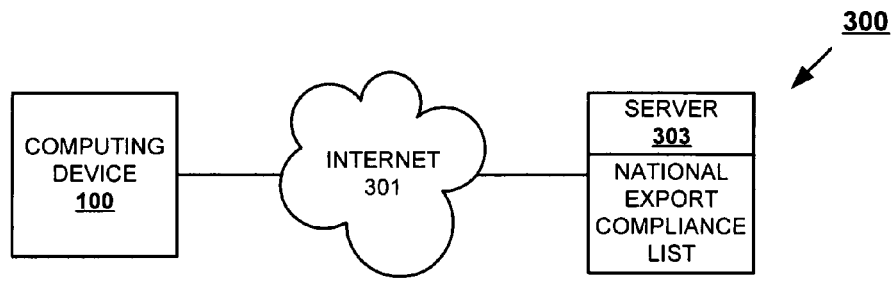
FIG. 3A is a flow chart depicting the process by which the computing device responds to operation within an export restricted location according to one embodiment of the invention.
Figure 3B:
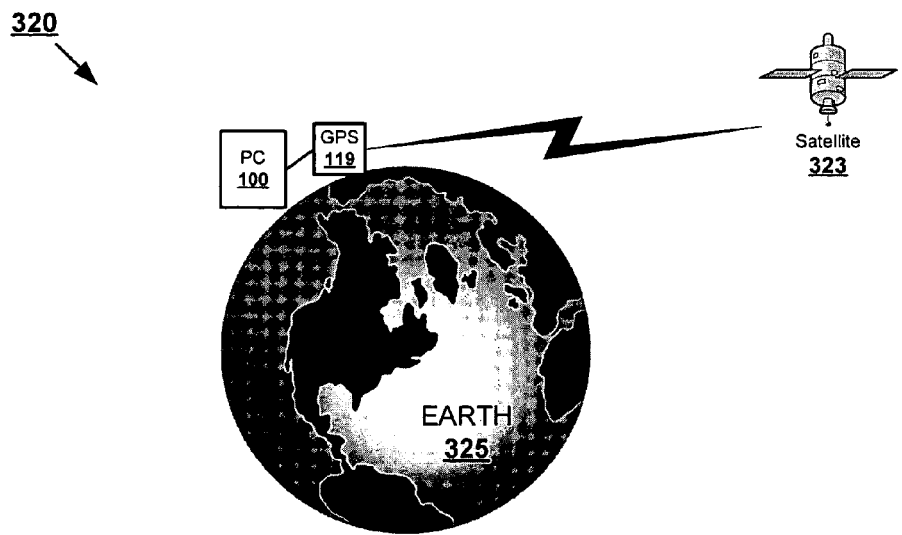
FIG. 3B is a GPS based global network utilized for identifying a geographic location of a portable device according to one embodiment of the invention.

BIOS 209 includes a location register 211 which stores the current country location provided by the GPS sensor 119. FIG. 3B illustrates a GPS network 320 in which the GPS sensor 119 of computing device 100 receives device location data/information from a satellite 323 orbiting the earth 325. In one embodiment, this GPS sensor (or other country locator) is packaged with export compliance software (ECS) (described below) or with the specific software that is export-restricted. With the latter implementation, the device must be installed along with the software before the specific restricted features of the software become functional within the computing device.

Referring back to FIG. 2, BIOS 209 also comprises a table 213 in which the list of export restricted software (loaded on computing device 100) and corresponding restricted countries are stored. Table 213 receives input (or updates) from RFID receiver 117 and/or Internet browser application 215 which connects to the Internet via NIC 103. FIG. 3A illustrates a network 300 having the computing device 100 connected to a national export compliance server 303 via the Internet 301

Returning now to FIG. 1, stored within memory 105 are software modules including operating system (OS) 107 and two versions of software application 111A and 111B for executing on the processor 101. According to one implementation of the invention, a first version 111A is export-restricted while the second version 111B is not export-restricted. Also, in the illustrative embodiment, memory 105 also comprises export compliance software (ECS) 109, by which the location monitoring, country list updating, and disabling of restricted software and related features of the invention are provided. ECS 109 may be loaded on the computing device utilizing input drives 116 or downloaded from the Internet 301 via NIC 103.

In the described embodiment, a separate export compliance software package (ECS) is provided. This export compliance software is separate from the actual software that is being monitored for export compliance. This embodiment allows computing devices that are already loaded with the export-restricted software to be provided with the checking mechanism. This embodiment also provides a user with customizable software to assist the users in complying with export/import regulations. Users who frequently travel in and out of the country are able to customize the ECS based on the countries to which they travel and/or the software loaded on the computing device, and other user preferences, including what actions should be taken once the potential import/export violation is detected. Possible actions may include (1) notifying the user of potential violation, (2) disabling the software for a temporary duration with an ability to re-enable, (3) automatically removing the software upon detection from the device, and/or (4) launching a compliant version in the destination country instead of the non-compliant version. Also, these responses may be implemented at the detection time or at the occurrence of some other trigger event.

With ECS, when the geographic location is found in the list of export restricted locations, the compliance software detects which software products are potential export violations. In one embodiment, the software dials out and downloads the latest import/export compliance regulations on a periodic basis. Then, based on latest set of regulations, the software scans the computing device for pieces of software that would result in compliance violations to various countries. Depending on the type of software found, the compliance software then takes the action programmed by the user or software manufacturer. These actions range from warning/notifying the user, disabling the software (with a facility to re-enable it for later use), automatic removal of software, etc. These actions may occur at the detection time or upon some other event such as a first use of the software in the destination country. In one embodiment, detection of the location of the computing device may be determined by the port at which the computing device connects to the Internet or other network.

The port is determined when the computing device connects to the phone/DSL/ISDN or LAN or Wireless LAN, etc., in the destination country.

In one implementation, the export compliance software is packaged as an add-on to the computing device software (OS and/or applications) along with the country locator device. In another embodiment, the export compliance software is automatically downloaded from the web site of the restricted software into the computing device when the computing device is connected to the Internet. This latter implementation works best with browser-type applications (e.g., Netscape and IE), where the compliance software is packaged as an upgrade, similarly to the methods currently utilized to upgrade browsers and Internet-based applications.

Figure 5:
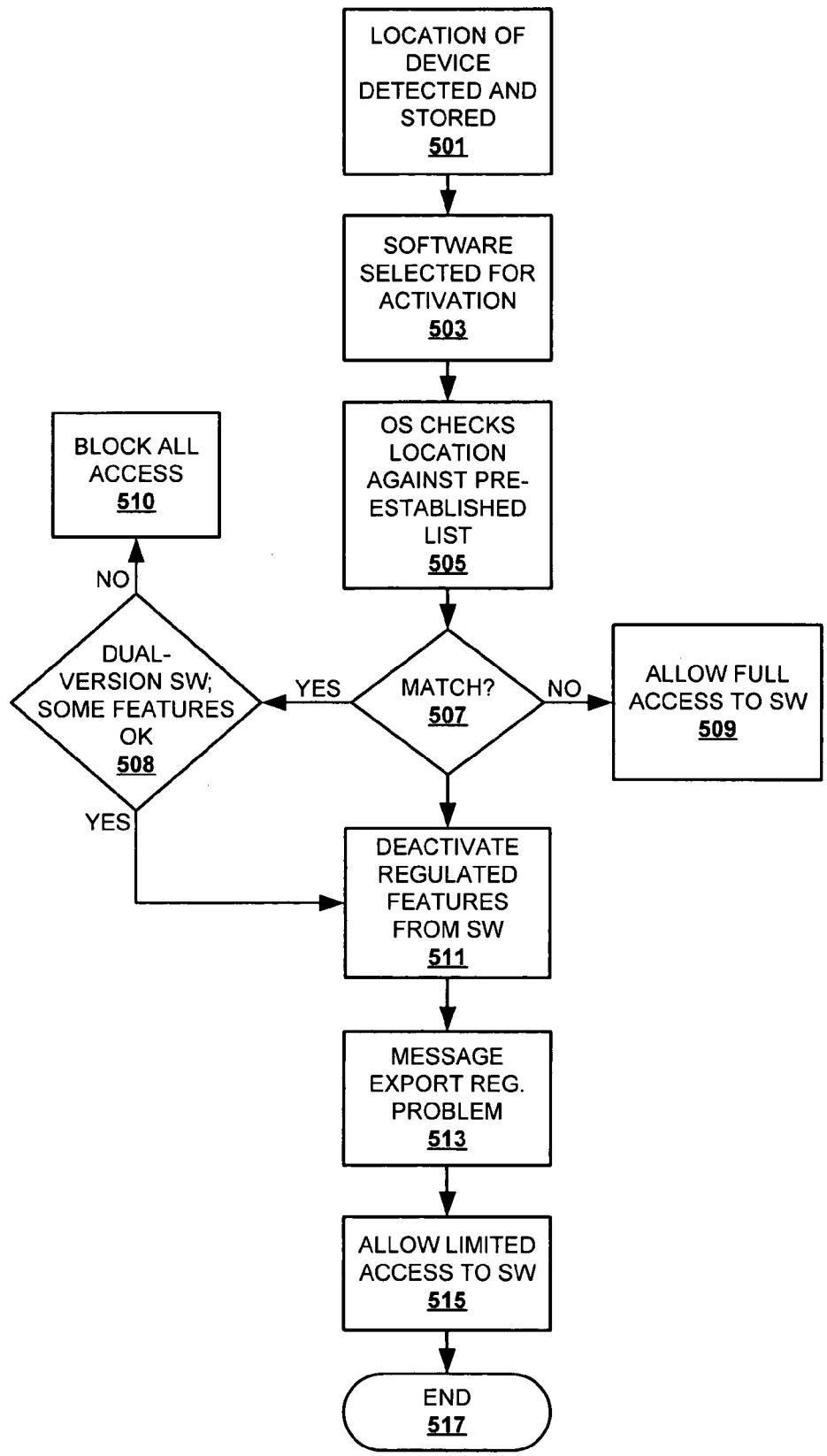
FIG. 5 is another flow chart depicting the process of dynamically switching versions of an application based on a trigger such as operation within a restricted geographic location in accordance with one implementation of the invention.

FIG. 5 illustrates the process by which the dynamic detection and deactivation of export-restricted software is completed. Prior to that process, however, the computing device is first loaded with software, which identifies itself to the OS as export-restricted or is identified as such by the installer of the software. The computing device is manufactured with or enhanced with a country location device, such as a low-end GPS device, linked to the BIOS and the OS of the computing device.

Referring now to the figure, the country location device (hereinafter "country locator") detects and stores the present geographic location of the computing device in the location register as indicated at block 501. The computing device is turned on and/or the software is selected for operation on the computing device as shown at block 503. ECS (and/or the OS) reads the value within the location register and, as depicted at block 505, compares the value against the table of pre-established locations/countries that are export-restricted for that software. A determination is made at block 507 whether the current location is on the export restricted list. Notably, this list may be a set of geographic coordinates or the actual name of the country. The exact form in which the information is presented and check is not limiting on the invention. When coordinates are utilized, however, the checking involves mapping the current value within a range of values and is thus more cumbersome to execute.

Notably, for extremely sensitive technology with extensive restrictions, the verification may simply compare the present location/country against a short list of un-restricted countries, rather than checking against the countries not authorized for the software. Where the country of origin retains exclusive access to the technology (e.g., restricted to use in the USA only), a simpler response would be to deactivate the software as soon as the computing device passes through an exit port.

Also, following an activation of the software in an export-restricted location, additional checks are provided by the software to ensure that subsequent activation is indeed within a restricted location, and this may require the user to enter particular information in response to a query generated by the software. This internal checking ensures that a user does not attempt to fool the system by tampering with the GPS device. In another related implementation, tampering with the GPS device or opening the computing device cover sets flag, which forces additional compliance checks when the user later attempts to activate the software.

Returning to FIG. 5, if the software has no export restrictions and/or the export restriction does not apply to the current location, full access is provided to the software as indicated at block 509. However, when the current location is a restricted location, a second check is made at block 508 whether the software has an unrestricted version or whether there are some features of the software which are not restricted. When the entire software is restricted, all access to the software is automatically blocked as shown at block 510. The entire software is disabled and a message sent to the user that the requested use is unauthorized in that country or violates an export restriction of the software.

However, when there are portions of the software that are unrestricted, the restricted features of the software are deactivated as shown at block 511. A message is then generated and sent to the user as indicated at block 513. The exact message depends on the ECS and user customizing of the ECS. Then, the features of the software that are not export restricted are activated and limited access is provided to that part of the software as shown at block 515. Then the process ends as indicated at block 517. When only particular restricted features are disabled and the remaining functions of the software are allowed to execute, the user of the computing device may receive a notification of the export restriction of the particular restricted features.

Figure 6:
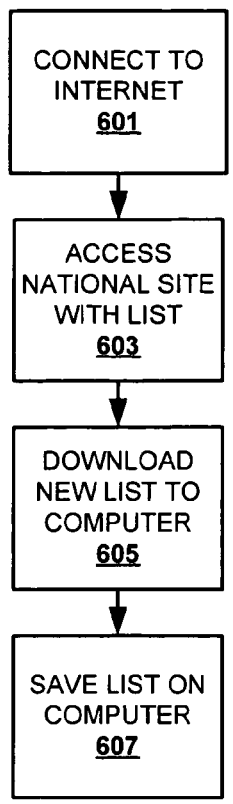
FIG. 6 illustrates a wide area network, such as the Internet with computer subsystems having localized RFID transmitters at exit ports according to one implementation of the present invention.

Because the list of export restricted software and associated restricted countries may change after the software is bought and/or loaded on the computing device, the invention provides two different implementations by which the list of export restricted countries (or geographic locations) is updated. The first implementation is illustrated by the flow chart of FIG. 6. The ECS and/or the installed (export restricted) software include a country update utility that monitors for connection to the Internet. Thus, the computing device is connected to the Internet as indicated at block 601. The ECS or country update utility automatically accesses an established national export regulation website (e.g., a commerce department import/export repository) once the Internet connection is established, as shown at block 603. When implemented via the country update utility, the utility then downloads the list of export restricted countries relevant for that software as indicated at block 605. When implemented via the ECS, however, the ECS downloads updates for all export restricted software loaded on the computing device. Since only a small number of software applications are export-restricted, this download may not involve a substantial amount of time or memory and processor resources. Once downloaded, the list of countries is stored within the table as indicated at block 607.

Notably, the country-update utility may either automatically download the list of countries during each internet connection or may download the list only when an update flag is placed on the website. That is updates to the list of countries for that software are made by the government personnel and a flag is automatically set on the site once that update is completed. In another implementation, the county update utility may download the current list based on a detected change in the value stored within the location register (i.e., indicating the computing device has been moved to another geographic location). With this implementation, one embodiment may provide the country update utility with the functionality to dial out and/or connect to the particular web site as required.

In one implementation, a monitoring feature is provided with the software and allows the software to register the locations in which the software has been utilized. During subsequent access to the web site, information about use within export-restricted locations may be provided anonymously. This enables the government or software manufacturer to track the extent of the use of the software in the export restricted locations.

Figure 4:
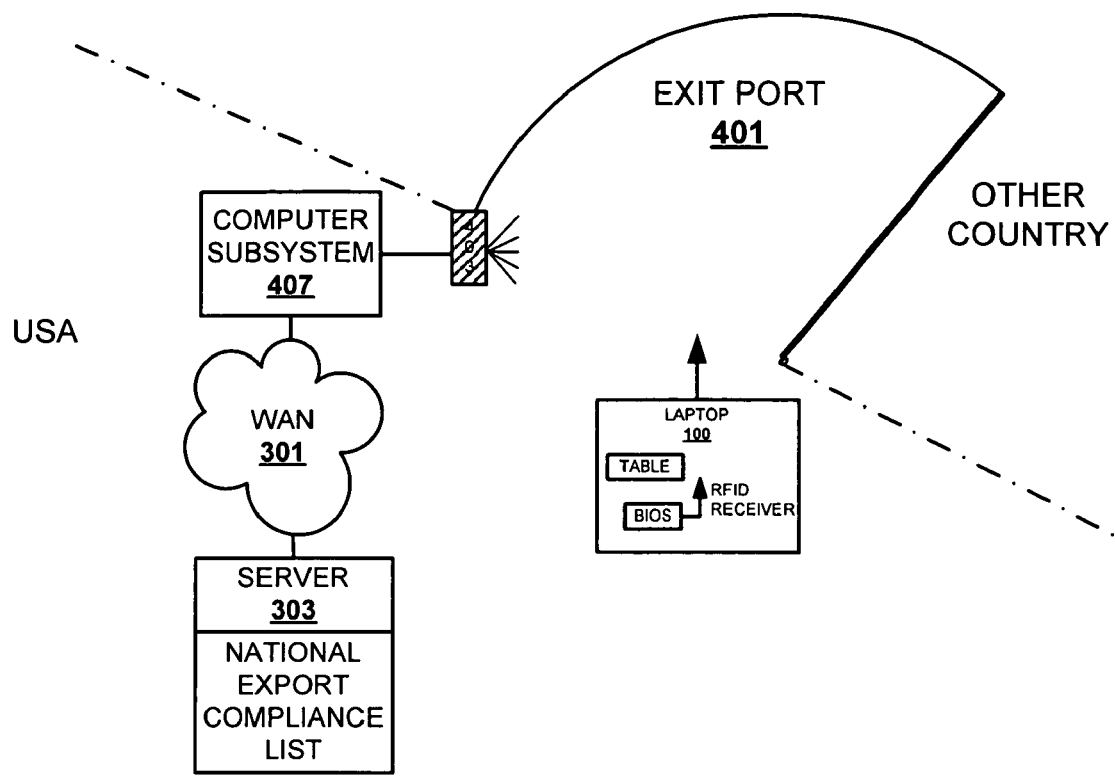
FIG. 4 is a flow chart depicting the process by which export restrictions for software are updated according to one embodiment of the invention.

FIG. 4 illustrates a different method by which the list of export restricted countries are provided or updated within the computing device. This second implementation involves the utilization of RFID (radio frequency identification) technology and/or other short range wireless technology. An RFID receiver is placed within the computing device (laptop) 100 as described above. This is a common implementation for current portable computing devices and thus requires little change to existing hardware. Each exit port (sea, land, air) 401 is equipped with an RFID transmitter 403, which is connected to an export compliance control subsystem that includes a computer subsystem 407 connected to the national export compliance server 303 via the Internet 301. The RFID transmitter 403 transmits the list of export restricted software and associated countries at the exit port 401. This list is received by the RFID receiver and stored in the memory (e.g., EEPROM) of the computing device 100.

Figure 7:
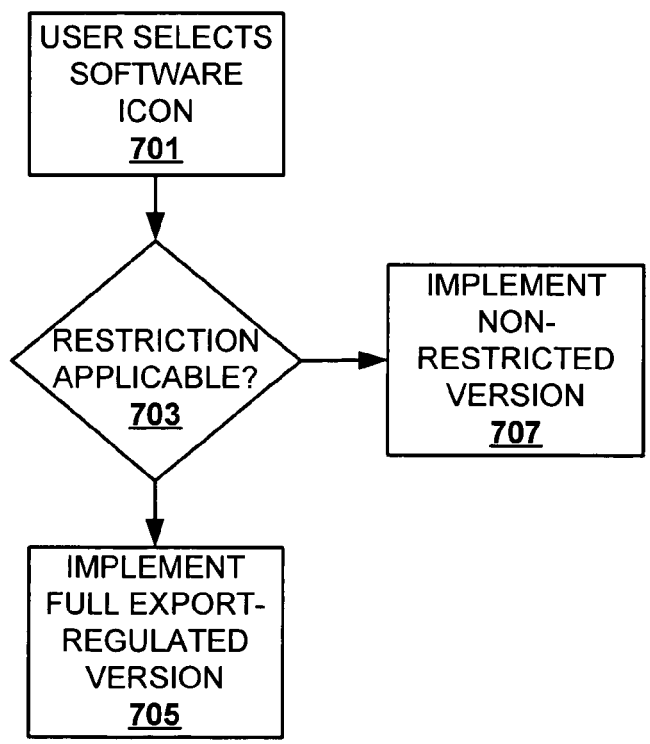
FIG. 7 illustrates a flow chart of the process of selecting which of two versions of a software to execute based on the location within which the software is being executed, according to one embodiment of the invention.

One extension of the features of the invention is provided for software that is packaged with both an export restricted version and a non-restricted version. FIG. 7 illustrates a flow chart of the selection process for executing such software applications. The features provided may also be applicable to software that comprises both a restricted feature and a restricted feature that may be implemented independently of each other (i.e., dual-functionality software). With such software, a logical assumption is that the restricted version provides more features and is the preferred version. A user wishes to default to the restricted version whenever that version is available, based on compliance checks against export restrictions, etc. The implementation provides a single selection point (e.g., selectable icon on the GUI) for the software (i.e., both accessed via the same icon). As shown at block 701, the user selects the software icon for execution of the software.

A background determination is made at block 703 whether the computing device is in a restricted location for that software. When the computing device is not in a restricted location, the complete (export regulated) version of the software is implemented as indicted at block 705. However, when the computing device is in a restricted location, only the non-regulated version of the software is provided as shown at block 707. Notably, the user may not be aware of the reasons why one version is provided versus another. For example, the Internet Explorer® browser may be opened without the encryption package and provide all other features. The software may provide a message that the encryption package is unavailable if he/she attempts to access that feature.

One embodiment of the invention may also allow of the user to deactivate the export restricted version or features of the software, so that the selection defaults to the non-restricted version. This implementation would then allow the user to have provide a password to enable access the export-regulated features, where the password is obtained after signing a license agreement that includes language about prosecution for unauthorized export of the export-regulated version of the software.

The ECS thus completes the following processes: (1) checks the geographic location against the list of export-restricted locations; (2) detect whether a requested application/product is a potential export violation; and (3) launch only a compliant version in the destination country (rather than the non-compliant version). These actions may occur at the detection time or upon some other trigger event, such as (1) opening the software in the destination country or (2) connecting the computing device to the phone or LAN or some other network for the first time in the destination country, for example.

Also, it is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a computing device having a location detecting mechanism, a method for enabling compliance with export restrictions on a component of the computing device, said method comprising:

detecting an attempt to enable said component for utilization by selection of a single startup icon associated with the component, wherein said component is a software application and two versions of the software application are stored on the computing device for executing on a processor of the computing device, wherein a first version of the software application is export-restricted and a second version of the software application is not export-restricted;

automatically identifying a current location of the computing device prior to enabling utilization of the component;

determining when said current location is one of a pre-identified unauthorized location in which the first version of the software application is not authorized to be utilized;

in response to said current location being an authorized location for utilization of said component, activating said component for utilization within said computing device by executing the first version of the software application on the processor; and in response to the current location being one of the pre-identified un-authorized locations, preventing the first version of the software application from being utilized while the computing device is within the pre-identified unauthorized location, wherein said export restrictions on said first version of the software application is enforced;

wherein both the first version of the software application that is export-restricted and the second version of the software application that is not export restricted are concurrently installed on the computing device and execution of one of the two versions of the software application is initiated via selection of a single selection/startup icon on a graphical user interface (GUI) of the computing device, which selection activates the export-restricted first version as a default version when the current location is an authorized location and activate the second version only when the current location is not an authorized location;

wherein said preventing step includes automatically disabling only the export-restricted first version of said software application while the device is in the unauthorized location;

wherein said first version is automatically activated for utilization in all locations that is not one of the pre-identified unauthorized locations and said second version is activated for utilization only when a request for utilization of said component is detected within a location that is one of the pre-identified unauthorized locations;

wherein seamless activation of one of the versions of the software application is provided via the single startup icon, regardless of the location in which the computing device is being utilized.

2. The method of claim 1, further comprising:
outputting a message that said component was not authorized to be utilized in said current location.

3. The method of claim 1, wherein said component includes a first feature that is export-restricted and a second feature that is not export restricted, wherein said enforcing step includes disabling only said export-restricted first feature of said component, wherein said second feature is automatically activated when a request for access to said component is detected.

4. The method of claim 1, wherein said automatically identifying further comprises:
reading the current location from the location detecting mechanism;
recording the current location within a register of said computing device; and
retrieving the current location from the register in response to detecting the attempt to enable said component for utilization.

5. The method of claim 1, further comprising:
detecting a connection of said computing device to the Internet; and
in response to detecting the connection to the internet while the component is present within the computing device;
accessing a website containing a list of export-restricted components and associated restricted countries;
downloading relevant ones of said export restricted components and associated restricted countries; and
storing said relevant ones within a memory of said computing device.

6. The method of claim 5, wherein said accessing, downloading and storing functions are dynamically completed.

7. The method of claim 1, further comprising:
receiving, via an embedded RFID (radio frequency identification) receiver of the computing device, RFID signals comprising a list of export-restricted components and associated restricted countries; and
storing relevant ones of said export restricted components and associated restricted countries within a memory of said computing device.

8. The method of claim 1, wherein said enforcing of said export restrictions comprises one or more of:
disabling the component from being activated for operation within the computing device;
automatically removing said component from said computing device; and
prompting for entry of access permissions prior to authorizing access to and utilization of said component, wherein said access is provided only after verification of an entered authorization code.

9. The method of claim 1, wherein said identifying of a current location comprises detecting said location from an access port utilized to provide a connection at the current location by said computing device to a network.

10. The method of claim 1, further comprising:
detecting a connection of the computing device to the Internet; and
automatically downloading export compliance features of specific applications on said computing device when the component is initially installed in the computing device without said export compliance features and the computing device has not yet been updated with the export compliance features for that component.

11. A computer program product for execution within a computing device having a location detecting mechanism, said computer program product comprising:
a computer readable device;
program code on said computer readable device for enabling compliance with export restrictions on a component of the computing device, said program code comprising code for:
detecting an attempt to enable said component for utilization by selection of a single startup icon associated with the component, wherein said component is a software application and two versions of the software application are stored on the computing device for executing on a processor of the computing device, wherein a first version of the software application is export-restricted and a second version of the software application is not export-restricted;
identifying a current location of the computing device prior to enabling utilization of the component;
determining when said current location is one of a pre-established un-authorized location in which the first version of the software application is not authorized to be utilized; and
in response to the current location being one of a pre-established un-authorized location:
enforcing said export restriction on said component by (a) preventing the first version of the software application from being executed while the computing device is within the current location that is one of the un-authorized locations; and
executing the second version of the software application; and
wherein both the first version of the software application that is export-restricted and the second version of the software application that is not export restricted are concurrently installed on the computing device and execution of one of the two versions of the software application is initiated via selection of a single selection/startup icon on a graphical user interface (GUI) of the computing device, which selection activates the export-restricted first version as a default version when the current location is an authorized location and activate the second version only when the current location is not an authorized location;
wherein said program code for said enforcing includes code for disabling only said export-restricted first version of said software application when the device is in the un-authorized location;
wherein said first version is automatically activated for utilization in all locations that is not one of the pre-identified unauthorized locations and said second version is activated for utilization only when a request for utilization of said component is detected within a location that is one of the pre-identified unauthorized locations;
wherein seamless activation of one of the versions of the software application is provided via the single startup icon regardless of the location in which the computing device is being utilized.

12. The computer program product of claim 11, further comprising program code for:
detecting a request for utilization of said component;
retrieving the current location of the computing device;

activating said component for utilization within said computing device when said current location is an authorized location for utilization of said component; and outputting a message that said component was not authorized to be utilized in said current location when said current location is an unauthorized location for utilization of said component.

13. The computer program product of claim 12, wherein said component includes a first feature that is export-restricted and a second feature that is not export restricted, wherein said program code for completing said enforcing step includes code for disabling only said export-restricted first feature of said component, wherein said second feature is automatically activated when a request for access to said component is detected.

14. The computer program product of claim 11, further comprising program code for:

detecting a connection of said computing device to the Internet; and in response to detecting the connection to the internet while the component is present within the computing device:
  automatically accessing a website containing a list of export-restricted components and associated restricted countries;
  dynamically downloading relevant ones of said export restricted components and associated restricted countries; and
  storing said relevant ones within a memory of said computing device.

15. The computer program product of claim 11, further comprising program code for:

detecting, via an embedded radio frequency identification (RFID) receiver of the computing device, RFID signals comprising a list of export-restricted components and associated restricted countries;

receiving via the RFID receiver, signals comprising the list of export-restricted components and associated restricted countries; and storing relevant ones of said export restricted components and associated restricted countries within a memory of said computing device.

16. The computer program product of claim 11, wherein said program code for enforcing of said export restrictions comprises program code for completing one or more of:

disabling the component from being activated for operation within the computing device automatically removing said component from said computing device; and prompting for entry of access permissions prior to authorizing access to and utilization of said component, wherein said access is provided only after verification of an entered authorization code.

17. The computer program product of claim 11, wherein said program code for identifying a current location comprises code for detecting said location from an access port utilized to provide a connection at the current location by said computing device to a network.

18. The computer program product of claim 11, further comprising program code for:

detecting a connection of the computing device to the Internet; and automatically downloading export compliance features of specific applications on said computing device, when said specific applications are initially installed without said export compliance features and have not yet been updated with such features.

19. In a computing device, a system for enabling compliance with export restrictions on a component of the computing device, said system comprising:

a location detecting mechanism that identifies a current location of the computing device;

an RFID (radio frequency identification) receiver that dynamically receives RFID signals at strategic exit locations with RFID transmitters, which broadcast a list of export restricted components and the countries and locations in which the restrictions apply;

a memory which stores the list of export restricted components and countries received by the RFID receiver; and an export compliance software (ECS) utility that executes on a processor of the computing device to cause the computing device to:
  retrieve the current location of the computing device;
  determine when said current location is one of a pre-established unauthorized location in which at least one version of said component is not authorized to be utilized; and
  in response to the current location being one of the pre-established unauthorized location, enforce said export restriction on said component by:
    detecting an attempt to enable said component for utilization, wherein said component is a software application and two versions of the software application are stored on the computing device for executing on a processor of the computing device, wherein a first version of the software application is export-restricted and a second version of the software application is not export-restricted;
    preventing the first version of the software application from being executed while the computing device is within the current location that is one of the pre-established unauthorized locations; and
    executing the second version of the software application, wherein the at least one version of the component that is export restricted is prevented from operating within said current location.

20. The system of claim 19, wherein:

said location detection mechanism:
  determines the current location of the device; and
  records the current location within a location register of said computing device; and said computing device retrieves the current location from the location register.

21. The system of claim 19, said ECS utility further causes the computing device to:

detect a request for utilization of said component;

activate said component for utilization within said computing device when said current location is an authorized location for utilization of said component; and output a message that said component was not authorized to be utilized in said current location when said current location is an unauthorized location for utilization of said component.

22. The system of claim 21, wherein said component includes a first feature that is export-restricted and a second feature that is not export restricted, wherein said computing device enforces the export restriction by disabling only said export-restricted first feature of said component, wherein said computing device automatically activates said second feature when a request for access to said component is detected while the device is within the unauthorized location.

23. The system of claim 19, wherein both the first version of the software application that is export-restricted and the second version of the software application that is not export restricted are concurrently installed on the computing device and execution of one of the two versions of the software application is initiated via selection of a single selection/startup icon on a graphical user interface (GUI) of the computing device, which selection activates the export-restricted first version as a default version when the current location is an authorized location and activate the second version only when the current location is not an authorized location, wherein said computing device enforces the export restriction by disabling only said export-restricted first version of said software application, wherein said computing device automatically activates said first version when a request for utilization of said software application is detected in all locations that are not one of the pre-defined unauthorized locations and said computing device activates said second version for utilization only when a request for utilization of said software application is detected within a location that is one of the pre-identified un-authorized location, wherein seamless activation of one of the versions of the software application is provided using the single startup icon, regardless of the location in which the device is being utilized.

24. The system of claim 19, said ECS utility further causes the computing device to:
    detect a connection of said computing device to the Internet; and
    in response to detecting the connection to the internet while the component is present within the computing device:
        automatically access a website containing a list of export-restricted components and associated restricted countries;
        dynamically download relevant ones of said export restricted components and associated restricted countries; and
        store said relevant ones within a memory of said computing device.

25. The system of claim 19, said ECS utility further causes the computing device to:
    register a receipt from the RFID receiver of the RFID signals comprising the list of export-restricted components and associated restricted countries; and
    store relevant ones of said export restricted components and associated restricted countries within a memory of said computing device.

26. The system of claim 19, wherein said computing device enforces said export restrictions by completing one or more of:
    disabling the component from being activated for operation within the computing device
    automatically removing said component from said computing device; and
    prompting for entry of access permissions prior to authorizing access to and utilization of said component, wherein said access is provided only after verification of an entered authorization code.

27. The system of claim 19, wherein said location detecting mechanism identifies a current location by detecting said current location from an access port utilized to provide a connection at the current location by said computing device to a network.

28. The system of claim 19, wherein the ECS utility further causes the computing device to:
    detect a connection of the computing device to the Internet; and
    automatically download export compliance features of specific applications on said computing device, when said specific applications are initially installed without said export compliance features and have not yet been updated with such features.

29. The system of claim 19, wherein said location detecting mechanism is a global positioning system (GPS) device that is linked to a basic input/output system (BIOS) and an operating system (OS) of the computing device, wherein the BIOS comprises a table in which a list of export restricted software and corresponding restricted countries are stored, wherein the computing device updates the table with inputs from RFID receiver and a national export compliance server to which the computing device connects via the Internet.

* * * * *